United States Patent [19]

Wyse et al.

[11] 4,141,715
[45] Feb. 27, 1979

[54] METHOD AND APPARATUS FOR PRODUCING A NITRATE FERTILIZER

[76] Inventors: Harold G. Wyse; Millard S. Smith, both of 3629 N. Dixie Dr., Dayton, Ohio 45414

[21] Appl. No.: 786,609

[22] Filed: Apr. 11, 1977

[51] Int. Cl.² .......................... B01K 1/00; C05C 5/00
[52] U.S. Cl. ....................................... 71/58; 204/179; 422/186
[58] Field of Search ............... 204/178, 179; 23/259.1; 71/58; 250/542, 547

[56] References Cited

U.S. PATENT DOCUMENTS

| | | | |
|---|---|---|---|
| 1,073,823 | 9/1913 | Siebert | 204/179 |
| 1,130,940 | 3/1915 | Summers | 204/179 |
| 1,370,295 | 3/1921 | DuPont | 204/179 |
| 1,408,625 | 3/1922 | Miles | 204/179 |
| 2,415,822 | 2/1947 | Holmen | 204/179 |
| 4,010,897 | 3/1977 | Treharne | 204/179 |

Primary Examiner—S. Leon Bashore
Assistant Examiner—Chris Konkol
Attorney, Agent, or Firm—Jacox & Meckstroth

[57] ABSTRACT

Pressurized air is directed into a generally spherical combustion chamber to rotate an electrical arc within a circular aperture formed within an electrode element disposed within the center portion of the chamber. The air is directed through the aperture and the whirling arc to produce a nitrogen dioxide gas which is immediately aspirated into a recirculating flow of water. The water is directed through an elongated tube forming an absorption coil where the gas is absorbed into the water to form a dilute acid solution usable as a nitrate fertilizer.

11 Claims, 3 Drawing Figures

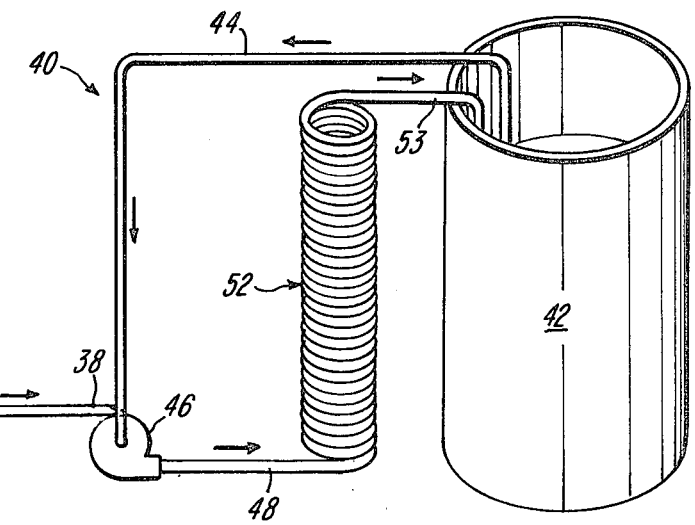
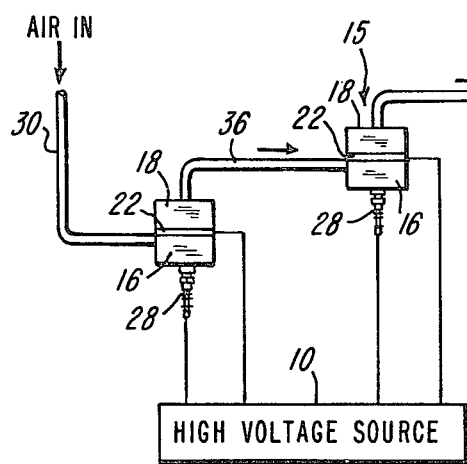
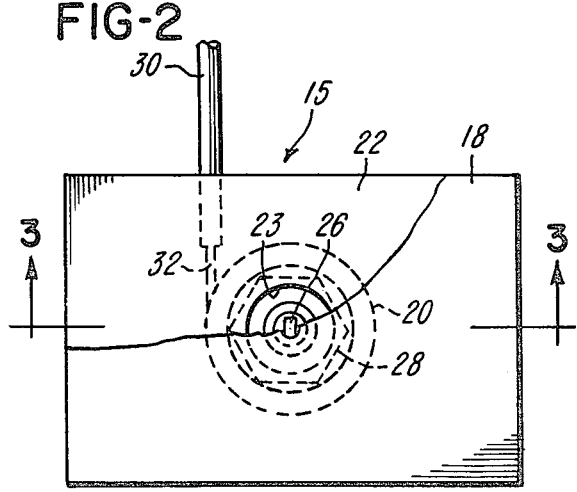
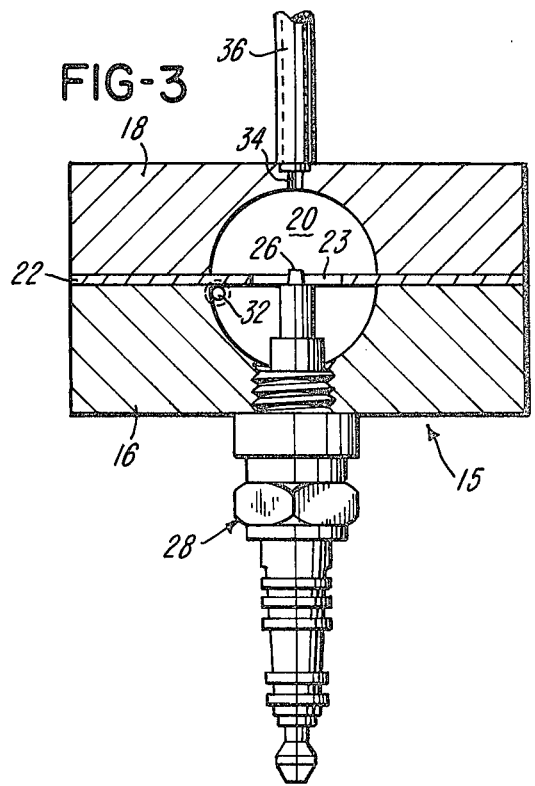

METHOD AND APPARATUS FOR PRODUCING A NITRATE FERTILIZER

BACKGROUND OF THE INVENTION

Current world food strategy relies heavily upon the use of improved technology. The societal need is now well established for a new, relatively low cost, minimally energy-consuming process for the production of fixed nitrogen that can be put into service with much lower capital outlay than existing technology offers and has the advantage of eliminating transportation costs.

Increased cost of nitrogen fertilizer is only one of the many results of an increasing world demand for food and a decreasing supply of natural gas and liquid hydrocarbons which provide the primary source of hydrogen used in their production. Long range solutions to the world food problem will require that more and more countries develop the capability to feed themselves rather than be dependant on ever increasing production from areas of the world which are currently experiencing high yields. This will be necessary not only for economic reasons (an underdeveloped country's ability to purchase in a competitive world market), but also to minimize the global effects of unfavorable weather or other natural disasters occuring in one of the high yield areas of the world.

The world food problem is increasing the demands for nitrogen fertilizer at a time when supplies of natural gas and other fuels used in their production are decreasing and becoming more expensive. One method to compensate for present and future shortages of nitrogen fertilizers is to produce nitrate fertilizer from air and water using electric arc discharge in air processes. However, to make electric arc discharge processes economically competitive, the need exists for a compact nitrate fertilizer production unit specifically designed for installation and use at the point of fertilizer aplication. Nitrate fertilizer generating systems installed on site can virtually eliminate storage, transportation and capital amortization costs which account for more than two thirds of the price of present day nitrogen fertilizers.

Prior to the development of the Haber-Bosch process for the production of ammonia fertilizer, a wide variety of methods were explored for the oxidation of nitrogen to nitrate fertilizers. Some of the more practical methods that evolved into commercial nitrate fertilizer production systems were based on the principle of combining the nitrogen and oxygen of air by means of various electrical arc discharge processes. However, to be economically competitive with natural fertilizer at that time, most of the arc process systems developed were located near large hydroelectric generating plants to minimize electrical power costs. With few exceptions, rural electrification did not exist. Consequently, line powered nitrate fertilizer generators were neither practical nor, perhaps, even considered.

With the advent of the Haber-Bosch process, using relatively inexpensive hydrogen obtained from natural gas and liquid hydrocarbon sources, the electric arc processes ceased to be competitive and were generally abandoned. It was found to be more efficient to use the same electrical energy to hydrolize water to produce hydrogen as the feed stock for the Haber-Bosch process.

Today, even with the shortage and increased cost of natural gas, calculations indicate that electric arc processes for the production of nitrate fertilizer probably could not be competitive if storage, transportation, distribution, and capital amortization costs were excluded. The largest proportion (often exceeding 75%) of the delivered price of anhydrous ammonia comes from costs other than actual production. Expensive storage and distribution costs generally arise since the ammonia production plants necessarily must be located close to large quantities of natural gas. Fertilizer usage is highly seasonal, but large Harber process plants must be operated on a continual basis such as 360 days per year to be cost efficient. With shortages of fossil energy becoming ever more acute, transportation costs will naturally increase and also create a double (one to produce - one to transport) expense from an energy economics point of view.

SUMMARY OF THE INVENTION

The present invention is directed to an improved and practical method and compact apparatus or unit for providing nitrate fertilizer and which is primarily intended for use at individualized locations for on site production. One form of this on site nitrate fertilizer production system utilizes wind-electric generators as the energy source to convert air and water to nitrate fertilizer. However, any alternate forms of electric power generation are also compatible with the system.

In general, nitrate fertilizer is produced in accordance with the invention by introducing pressurized air tangentially into a generally spherical chamber which receives concentric electrode elements for producing a rapidly swirling plasma arc. All of the air is required to pass through the arc for efficiently producing nitrogen oxide gases which are introduced into a continuous flow water recirculation system incorporating a long length of tubing. The tubing provides for substantial gas-water exposure time for promoting the efficient formation of nitric and nitrous acids.

Other features and advantages of the invention will be apparent from the following description, the accompanying drawing and the appended claims.

BRIEF DESCRIPTION OF THE DRAWING

FIG. 1 is a diagrammatic illustration of a unit or system constructed in accordance with the invention for producing a nitrate fetilizer;

FIG. 2 is an enlarged plan view of a plasma arc nitrogen oxide generating unit used in the system shown in FIG. 1; and FIG. 3 is a partial section view of the generating unit and taken generally on the line 3—3 of FIG. 2.

DESCRIPTION OF THE PREFERRED EMBODIMENTS

The system shown in FIG. 1 is effective to produce significant quantities of nitrogen oxides which are converted into a fetilizer. The energy requirements for the formation of nitrogen oxides in the electric arc process are given by one or more of the following reactions;

$$N_2 + O_2 \rightarrow 2NO, \Delta G = +41.4 \text{ Kcal}$$

$$2NO + O_2 \rightarrow 2NO_2, \Delta G = -16.6 \text{ Kcal}$$

$$N_2 + 2O_2 \rightarrow 2NO_2, \Delta G = +24.8 \text{ Kcal}$$

In the system shown and with optimum air flow rates, the principle end product in the electric arc reaction cell is nitrogen dioxide (NO$_2$). The nitrogen dioxide is readily trapped in water to form nitric acid (HNO$_3$) and nitrous (HNO$_2$) acids. By the addition of lime, Ca(OH)$_2$, to the water, these acids are converted primarily into calcium nitrate fertilizer. The nitrogen fertilizer may be used as it is produced by spraying, or alternately, if an existing irrigation system exists at the site, the nitrogen fertilizer simply may be fed into the irrigation feed water. A third option is to store the fertilizer as calcium nitrate (a very stable compound) in tanks, open basins or plastic lined trenches, and used when needed.

The system may consist of a small capacity system for the consumer market and which is designed to produce liquid fetilizer in a semi-permanent storage vessel from which it is syphoned into the water stream of a garden hose when the lawn, garden or other crop is watered. The system may also consist of a larger capacity field unit which utilizes either commercial or wind-electric generated power by manifolding a large number of smaller units to increase the capacity of fixed nitrogen production.

Electrical energy to drive the nitrogen fertilizer production system on a farm location may be obtained from a conventional 110 volt or 220 volt power source 10 which incorporates a step-up transformer to obtain the higher voltages desirable for electric arc processes. A more economical, and generally available, power source can be the 7200 volt system commonly used for distribution of residential power by most utility companies in the United States.

The following projected economic calculations are based on using power drawn from a 7200 volt transmission line power source to eliminate the need for a step-up voltage transformer. As indicated by the calculations, economic costs for the system, assuming 10% efficiency of the overall process, are competitive based on present day costs of anhydrous ammonia. Starting with theoretical energy requirements and assuming 10% efficiency for the formation of nitrogen dioxide by the arc discharge through air process, electrical energy costs are projected based on a system to produce one ton of fixed nitrogen. All estimates and assumptions are believed to be conservative.

Theoretical Energy Requirements

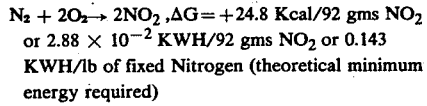

or 2.88 × 10$^{-2}$ KWH/92 gms NO$_2$ or 0.143 KWH/lb of fixed Nitrogen (theoretical minimum energy required)

Projected Electrical Energy Costs

Assuming 10% efficiency of the above reaction, one ton of fixed nitrogen would require 2000 × 0.469 = 9380 KWH per ton. Based on a commercial rate of two cents per KWH, projected electrical energy costs per ton of fixed nitrogen would be:

9380 × $0.02 = $188.00 per ton of fixed nitrogen.

As stated previously, wind-electric or other forms of power generation may be used to drive the system in which case the cost per ton of fixed nitrogen would be more dependant on capital costs for equipment and maintenance requirements for the equipment.

The high voltage electrical power from the power source 10 is supplied to a set of series connected air combustion units 15 each of which includes a pair of matching metal plates 16 and 18 cooperating to define a substantially spherical combustion chamber 20. A flat electrode plate or element 22 is formed of a high current conducting and wear resisting material such as silver bearing copper and is sandwiched between the plates 16 and 18 of each unit 15. The electrode element 22 has a circular opening or aperture 23 which is located within the center of the chamber 20, and the diameter of the aperture 23 is smaller than the diameter of the chamber 20. Another electrode element 26 is disposed concentrically within the center of the aperture 23 and consists of the center conductor of an electrode assembly 28 in the form of a spark plug. The high voltage electrical power is supplied across the electrode elements 22 and 26 to produce a radial arc within the aperture 23.

Pressurized air is supplied to the combustion units 15 through an air supply line 30 which is connected to the chamber 20 of the first unit 15 by an air inlet passage 32 (FIGS. 2 and 3) extending within the plate 16 tangentially from the chamber 20 adjacent the electrode plate 22. The combustion chamber 20 of the first unit 15 is exhausted through a port 34 which is formed within the plate 18 and extends from the center of the chamber 20 to a tube 36. The tube 36 connects with the tangential inlet passage 32 of the second air combustion unit 15, and the exhaust port 34 of the second unit 15 is connected by a tube or line 38 to a continuous flow water recirculating system 40.

When the high voltage from the power source 10 is applied across the electrode elements 22 and 26, a radial plasma arc is generated as mentioned above. The pressurized air introduced tangentially into the spherical combustion chamber 20 of each unit 15 circulates within the chamber and spirals along a helical path through the aperture 23 so that the radial plasma arc circulates or rapidly rotates within the aperture 23. Thus all of the air introduced into each chamber 20 must pass through the rotating plasma arc before the air is discharged through the exhaust port 34 so that the air is subjected to combustion to produce the nitrogen gases mentioned above.

The continuous flow water recirculating system 40 includes a storage tank 42 from which water or solution is sucked through a line 44 by a motor driven pump 46. The gases discharged through the line 38 from the second air combustion unit 15 are introduced into the pump suction line 44 by an aspirating or syphon action. The water and gas mixture is then circulated through an elongated tube 48 arranged to form an absorption coil 52. The end portion 53 of the tube 48 is directed back into the storage tank 42 to complete the recirculating system. The tube 48 forming the absorption coil 52 is extruded of a plastics material and has a substantial length, for example, up to 200 feet, in order to provide a substantial gas-water exposure time for efficiently producing or promoting the formation of nitric and nitrous acids. The length of the connecting line 38 is minimized so that the gases generated within the series connected air combustion units 15 do not have an opportunity to cool before the gases are introduced into solution within the recirculating water line 44.

From the drawing and the above description, it is apparent that the method and apparatus of the invention for producing a nitrate fertilizer, provides desirable features and advantages. For example, the apparatus is basically simple and relatively inexpensive in construction. In addition, the air combustion units 15 assure that all of the air flowing through each unit is required to pass through the plasma arc which is rotated in response to the circulating air passing through the combustion chamber. This provides each combustion unit with a relatively high efficiency of combustion. The combustion units 15 are also adapted to be connected in series and/or in parallel for increasing the volume and concentration of the gases produced. The recirculating system 40, including the absorption coil 52, further provides for increasing the volume of hot gases which go into solution before the gases have an opportunity to recombine. The recirculation progressively increases the concentration of the nitric and nitrous acids within the storage tank 42, resulting in a more efficient production of nitrate fertilizer.

In the calculations referred to above, a conservative 10% efficiency for the production of nitrate fertilizer has been assumed. Based upon this assumption, up to 90% of the input energy to the system would be available in the form of heat. This heat may be used for drying crops or for heating water or buildings. Such utilization of the excess heat would increase the overall efficiency of the fertilizer production system so that the net cost per ton of fixed nitrogen fertilizer may decrease to a point less than the current costs of producing nitrogen fertilizer by the ammonia process.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. A method adapted for efficiently producing a nitrate fertilizer, comprising the steps of forming a first electrode element defining a circular aperture of predetermined diameter, arranging said first electrode element concentrically within the center of a generally spherical air combustion chamber having a diameter larger than the diameter of said aperture, arranging a second electrode element within the center of said aperture, supplying an electrical voltage across said electrode elements to produce an electrical plasma arc therebetween, producing a spiral flow of air within said spherical chamber to effect rotation of the arc within the aperture, directing the spiral flow of air through the aperture for efficiently generating a nitrogen dioxide gas, introducing the gas from the combustion chamber directly into a flow of water, and directing the water and gas through an elongated tube forming an absorption coil to produce a dilute acid solution usable as a nitrate fertilizer.

2. A method adapted for efficiently producing a nitrate fertilizer, comprising the steps of forming a plurality of air combustion units each having a generally flat first electrode element defining a circular aperture, arranging the first electrode element of each combustion unit within a corresponding circular air combustion chamber having a diameter larger than the diameter of the aperture, arranging a second electrode element substantially within the center of the aperture of said first electrode element of each unit, supplying an electrical voltage across the electrode elements of each unit to produce an electrical arc therebetween, producing a spiral flow of air within the chamber of each unit to effect rotation of the arc within the aperture, directing the flow of air within each unit through the rotating arc within the corresponding aperture for generating a nitrogen dioxide gas, connecting the units in series with the air and gas exhausted from the first unit being directed through the second unit, directing the gas from the series connected combustion units into a flow of water, directing the water and gas through an elongated tube to produce a dilute acid solution usable as a nitrate fertilizer, and recirculating the solution within the tube while gas is being directed into the solution to increase the concentration of the solution.

3. Apparatus for producing a nitrate fertilizer, comprising at least one air combustion unit including a body defining a substantially spherical combustion chamber, a generally flat first electrode plate disposed within the center of said chamber and defining a substantially circular aperture having a diameter smaller than the diameter of said chamber, a second electrode element projecting into said chamber generally perpendicular to said first electrode plate and disposed substantially within the center of said aperture, means defining an inlet passage within said body on one side of said electrode plate for introducing a flow of pressurized air into said spherical chamber and for directing all of the flow of air through said aperture, means defining an exhaust passage for said spherical chamber on the opposite side of said electrode plate, means for supplying a high voltage to said electrode plate and electrode element to produce an electrical arc therebetween, the flow of air through said aperture and the arc within said aperture being effective to generate a nitrogen dioxide gas, and means for introducing the gas into a supply of water to produce a dilute acid solution usable as a nitrate fertilizer.

4. Apparatus as defined in claim 3 wherein said inlet passage is disposed adjacent to and generally parallel to said first electrode element and is offset radially outwardly from said aperture.

5. A method adapted for efficiently producing a nitrate fertilizer, comprising the steps of forming a generally flat first electrode plate defining a circular aperture of predetermined diameter, arranging said electrode plate concentrically within the center of a generally spherical air combustion chamber having a diameter larger than the diameter of said aperture, arranging a second electrode element within the center of said aperture, supplying an electrical voltage across said electrode plate and the electrode element to produce an electrical plasma arc therebetween, introducing a flow of air into the spherical chamber on one side of the electrode plate, and directing all of the flow of air through the aperture for efficiently generating a nitrogen dioxide gas.

6. A method as defined in claim 5 including the step of aspirating the nitrogen dioxide into a flow of water within a tube to form a dilute acid solution, directing the solution through the tube and into a storage vessel, and recirculating the solution from the vessel into the tube for increasing the concentration of the solution.

7. A method adapted for efficiently producing a nitrate fertilizer, comprising the steps of forming a plurality of air combustion units each having a generally flat first electrode plate defining a circular aperture, arranging the first electrode plate of each combustion unit within a corresponding generally spherical air combustion chamber having a diameter larger than the diameter of the aperture, arranging a second electrode element substantially within the center of the aperture of said first electrode plate of each unit, supplying an electrical voltage across the electrode plate and electrode element of each unit to produce an electrical arc therebetween, introducing a spiral flow of air within the chamber of each unit on one side of the electrode plate to effect rotation of the arc within the aperture, directing all of the spiral flow of air within each unit through the rotating arc within the corresponding aperture for generating a nitrogen dioxide gas, and connecting the units in series with the air and gas exhausted from the first unit being directed through the second unit.

8. Apparatus for producing a nitrate fertilizer, comprising at least one air combustion unit including a body defining a combustion chamber having a circular configuration, a generally flat first electrode element disposed within said chamber and defining a substantially circular and concentric aperture having a diameter smaller than the diameter of said chamber, a second electrode element projecting into said chamber and disposed concentrically with said aperture, means defining an inlet passage within said body on one side of said first electrode element for introducing pressurized air into said chamber and for causing a spiral flow of air through said aperture, means defining an exhaust passage for said chamber on the opposite side of said first electrode element to assure that all of the air flowing through said inlet passage into said chamber passes through said aperture, means for supplying a high voltage to said electrode elements to produce an electrical arc therebetween, said spiral flow of air through said aperture being effective to rotate the arc within said aperture for subjecting a high proportion of said air flow to the arc for efficiently generating a nitrogen dioxide gas, means defining a water storage chamber, an absorption coil of tubing having substantial length, means for recirculating water from said storage chamber through said tubing forming said coil, and means for introducing the gas generated by said combustion unit directly into the water flowing within said tubing forming said coil to provide substantial gas-water exposure time for the nitrogen oxides to dissolve into the water.

9. Apparatus as defined in claim 8 wherein said tubing forming said coil has a length greater than one hundred feet.

10. Apparatus as defined in claim 8 wherein said tubing comprises a plastics material and extends along a helical path.

11. Apparatus as defined in claim 8 wherein said combustion chamber is generally spherical in configuration, and said second electrode elements is disposed generally within the center of said chamber.

* * * * *